United States Patent [19]

Jang

[11] Patent Number: 5,569,116
[45] Date of Patent: Oct. 29, 1996

[54] ELECTRONIC AND HYDRAULIC SYSTEM OF FIVE SPEED AUTOMATIC TRANSMISSION

[75] Inventor: Jae-Duk Jang, Kyunggi-Do, Rep. of Korea

[73] Assignee: Hyundai Motor Company, Seoul, Rep. of Korea

[21] Appl. No.: 366,892

[22] Filed: Dec. 30, 1994

[30] Foreign Application Priority Data

Dec. 31, 1993 [KR] Rep. of Korea ................. 1993-32032

[51] Int. Cl.$^6$ ................................................ F16H 61/26
[52] U.S. Cl. ........................ 477/130; 477/126; 477/131; 475/128
[58] Field of Search ................... 477/126, 127, 477/130, 131; 475/127, 128

[56] References Cited

U.S. PATENT DOCUMENTS

| | | | |
|---|---|---|---|
| 4,136,584 | 1/1979 | Ishikawa | 477/156 X |
| 4,776,240 | 10/1988 | Miki . | |
| 4,831,900 | 5/1989 | Yamamoto et al. | 477/155 X |
| 4,838,126 | 6/1989 | Wilfinger et al. | 477/129 |
| 4,840,092 | 6/1989 | Sakaguchi et al. | 477/155 X |
| 5,079,973 | 1/1992 | Ookubo et al. | 477/126 |
| 5,150,297 | 9/1992 | Daubenmier et al. | 477/155 X |
| 5,157,608 | 10/1992 | Sankpal et al. | 477/155 X |
| 5,305,663 | 4/1994 | Leonard et al. | 477/155 X |

*Primary Examiner*—Charles A. Marmor
*Assistant Examiner*—Peter Kwon

[57] ABSTRACT

An electronic and hydraulic system of a five speed automatic transmission adapted to establish five forward and one reverse gear ratios by way of effecting selective engagement and disengagement of friction elements comprises an oil pump for producing a pressurized working fluid, a manual selector valve manually operated for distributing the working fluid to forward and reverse fluid lines, first to fourth shift valves for directing the working fluid to one of the friction elements, first to fourth solenoid valves associated with the first to fourth shift valves, respectively, for controlling positions of the shift valves in correspondence to a vehicle speed and a throttle opening degree, second to fourth speed valves each position-controlled by the first to third shift valves to change flow path of the working fluid and an overdrive unit valve position-controlled by the fourth shift valve.

17 Claims, 15 Drawing Sheets

FIG. 2

| | C1 | C2 | C3 | C4 | C5 | F1 | F2 | F3 | F4 | B1 | B2 | B3 | B4 | EFFECTIVE FOR ENGINE BRAKING |
|---|---|---|---|---|---|---|---|---|---|---|---|---|---|---|
| P | × | × | × | × | × | × | × | × | × | × | × | × | × | |
| R | × | × | × | O | O | × | O | × | O | O | × | × | × | O |
| N | × | × | × | × | O | × | × | × | × | × | × | × | × | |
| D 1 | × | O | × | × | O | O | × | × | O | × | × | × | × | × |
| D 2 | × | O | × | × | O | O | × | O | O | × | O | × | × | × |
| D 3 | × | O | O | × | O | O | × | × | O | × | O | × | × | × |
| D 4 | × | O | O | × | O | × | × | × | O | × | O | O | × | O |
| D 5 | × | O | O | × | × | × | × | × | × | × | O | O | O | O |
| D 1 | × | O | × | × | O | O | O | × | O | × | × | × | × | × |
| D 2 | × | O | × | × | O | O | × | O | O | × | O | × | × | × |
| D 3 | × | O | O | × | O | O | × | × | O | × | O | × | × | × |
| D 4 | × | O | × | × | O | × | × | × | O | × | O | O | × | O |
| III 1 | O | O | × | × | O | O | O | O | O | × | × | × | × | × |
| III 2 | O | O | O | × | O | O | × | × | O | × | O | × | × | × |
| III 3 | O | O | × | × | O | O | × | × | O | O | O | O | × | O |
| II 1 | O | O | × | × | O | O | O | × | O | × | × | × | × | O |
| II 2 | O | O | × | × | O | O | × | × | O | × | × | O | × | O |
| I | O | O | × | × | O | O | O | × | O | O | × | × | × | O |

ELECTRONIC AND HYDRAULIC SYSTEM OF FIVE SPEED AUTOMATIC TRANSMISSION

FIELD OF THE INVENTION

The present invention is directed to an automatic transmission for a motor vehicle; and, more particularly, to an electronic and hydraulic system for use in a five speed automatic transmission which has an enhanced shift response with a long-term reliability.

Description of the Prior Art

As is well-known in the art, an automatic transmission for an automotive vehicle includes, among other things, a torque converter, a gear train drivingly coupled to the torque converter, a plurality of friction elements selectively engaged and disengaged by a fluid pressure for changing the power delivery path via the gear train to establish a variety of forward and reverse gear ratios and a hydraulic control system, responsive to the vehicle speed, throttle opening degree and other vehicle operating parameters, for controlling the behavior of the friction elements. The torque converter, the gear train and the friction elements are often referred to collectively as a "power train" in the automatic transmission art.

In a typical five speed automatic transmission, the gear train is provided with at least two planetary gear sets, each of which in turn has a sun gear, an annulus gear and three or more pinion gears interposed between the sun gear and the annulus gear. Moreover, the friction elements include a number of hydraulically operated clutches, e.g., a forward clutch, an overrun forward clutch, a third speed clutch, a reverse clutch and an overdrive unit clutch, and a number of hydraulically operated brakes, e.g., a low/reverse brake, a second speed brake, a fourth speed band brake and a fifth speed brake. In addition to the above, use has been made of self-operated one way clutches that serve to make the individual gears of the planetary gear sets immovable in one direction but to allow the gears to rotate freely in the other direction.

To facilitate the engagement and disengagement of the hydraulically operated clutches and brakes, the hydraulic control system is provided with an oil pump for producing a pressurized fluid, a regulator valve adapted to adjust the pressure of the working fluid to thereby create a drive fluid of a low, middle or high pressure, a plurality of flow control spool valves for directing the drive fluid of the regulated pressure to the torque converter, the hydraulically operated clutches and the brakes, a pressure reducing valve for diminishing the pressure of the drive fluid to produce a low pressure pilot fluid, a series of solenoid valves electromagnetically actuated for controlling the positions of the flow control spool valves through the use of the pilot fluid and a manual selector valve actuated by the driver to select a specific shift range out of, e.g., parking, reverse, neutral and drive ranges. The hydraulic control system is operable in many differing ways, depending on the shift range chosen by the manual selector valve and the operative condition of the solenoid valves.

U.S. Pat. No. 4,776,240 dated Oct. 11, 1988 to Miki discloses an automatic transmission comprising: a fluid torque converter; a transmission gear including a first gear unit having three forward-speed gears and one reverse gear and a second gear unit having a high-speed gear and a low-speed gear; and a hydraulic control system including first and second shift valves for controlling the shifting between the speed gears of the first gear unit, a third shift valve for controlling the shifting between the high-speed gear and the low-speed gear of the second gear unit, a manual selector valve having five shift positions, i.e., D, L, R and P-positions, and first, second and third solenoid valves related with the first, the second and the third shift valves, respectively.

The automatic transmission is capable of providing a six forward-speed automatic transmission when the manual selector valve is shifted to the D-position; a three forward-speed automatic transmission including the first, third and fifth speeds when the manual selector valve is shifted to the I-position, three forward-speed automatic transmission including the first, third and fifth speeds and allowing an effective engine braking when the manual selector valve is shifted to the L-position; and a two-speed reverse automatic transmission when the manual selector valve is shifted to the R-position.

Although the automatic transmission noted above is said to reduce the number of valves and attendant component parts, it requires the use of large-sized solenoid valves so as to directly control the flow of a working fluid supplied to the individual friction elements. Over time, the solenoid valves are apt to be damaged due to frequent on-off operations under heavy load conditions, which may lead to a premature failure of the solenoid valves, thus adversely affecting the reliability of the automatic transmission.

SUMMARY OF THE INVENTION

Accordingly, it is an object of the invention to provide an electronic and hydraulic system of a five speed automatic transmission which assures a reliable use thereof for an extended period of service time, while maintaining the number of valves as few as possible.

Another object of the invention is to provide an electronic and hydraulic system of a five speed automatic transmission which makes it possible to operate individual friction elements with an enhanced shift response.

A further object of the invention is to provide an electronic and hydraulic system of a five speed automatic transmission that can supply the friction elements with a sufficient amount of working fluid.

In accordance with the present invention, there is provided an electronic and hydraulic system of a five speed automatic transmission adapted to establish five forward and one reverse gear ratios by way of effecting selective engagement and disengagement of friction elements, which comprises an oil pump for producing a pressurized working fluid, a manual selector valve manually operated for distributing the working fluid to forward and reverse fluid lines, first to fourth shift valves for directing the working fluid to one of the friction elements, first to fourth solenoid valves associated with the first to fourth shift valves, respectively, for controlling positions of the shift valves in correspondence to a vehicle speed and a throttle opening degree, second to fourth speed valves, each of which is position-controlled by the first to third shift valves to change the flow path of the working fluid, and an overdrive unit valve which is position-controlled by the fourth shift valve.

BRIEF DESCRIPTION OF THE DRAWINGS

The above objects, features and advantages of the invention will become apparent from the following detailed description of preferred embodiments taken in conjunction with the accompanying drawings, in which:

FIG. 2 presents a table illustrating the operative condition of individual friction elements of the power train shown in FIG. 1 in various shift ranges;

DETAILED DESCRIPTION OF THE PREFERRED EMBODIMENT

Figure 1:
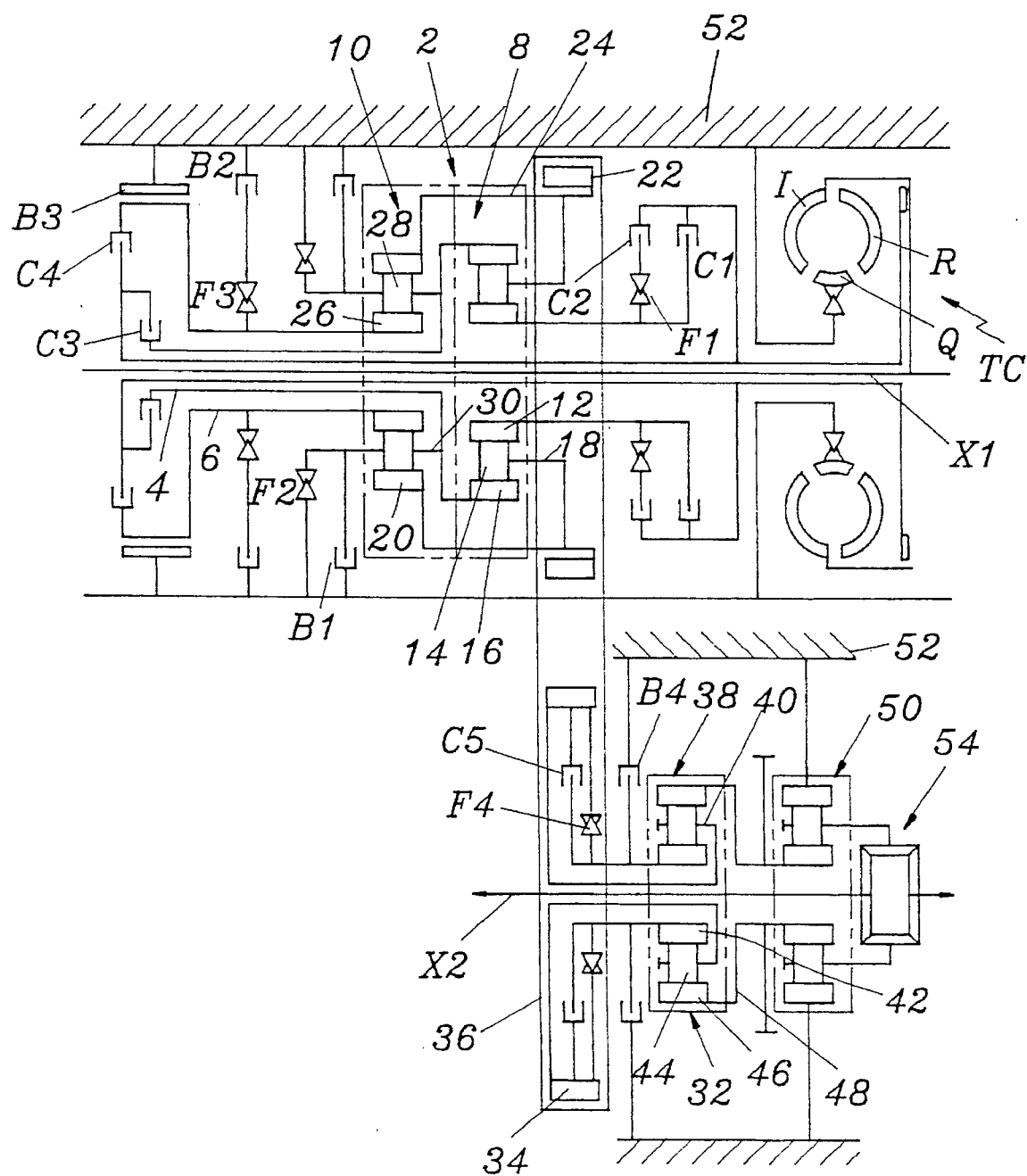
FIG. 1 offers a schematic diagram showing the power train of an automatic vehicle transmission to which the inventive hydraulic control system is applied.

Referring now to FIG. 1, there is schematically shown an exemplary power train of an automatic transmission to which the inventive hydraulic control system may be advantageously applied. The power train includes a torque converter TC that includes a pump impeller I directly coupled to an engine crankshaft(not shown), a turbine runner R lying in an opposing relationship with respect to the pump impeller I to receive varying levels of torque therefrom and a stator Q interposed between the pump impeller I and the turbine runner I for converting the flow direction of a working fluid in an effort to increase the torque of the turbine runner R.

The turbine runner R is drivingly connected to an input shaft X1 of a primary shift part 2 to deliver the engine rotary force thereto. Positioned about the input shaft X1 are a third stage input shaft 4 and a reverse sun gear shaft 6, both of which may be caused to rotate independently of one another.

The third stage input shaft 4 is adapted to receive the rotary force from the input shaft X1 via a third speed clutch C3 and then transfer the rotary force to a first planetary gear set 8. Likewise, the reverse sun gear shaft 6 is designed to receive the rotary force from the input shaft X1 via a reverse clutch C4 and then transfer the rotary force to a second planetary gear set 10.

The first and second planetary gear sets 8, 10 are combined to form the primary shift part 2 that plays a part in changing the gear ratios at a first place. The first planetary gear set 8 includes a sun gear 12 connectable to the input shaft X1 through an overrun forward clutch c1 and a forward clutch c2, a plurality of planet or pinion gears 14 kept in an externally meshing relationship with the sun gear 12 and an annulus or ring gear 16 meshing with the pinion gears 14 on its toothed internal surface. The pinion gears 14 are supported by a carrier 18 which in turn is integrally connected to an output drum 24. It can be seen that the output drum 24 serves to interconnect the second planetary gear set 10 and a drive sprocket 22 together.

As with the first planetary gear set 8 discussed above, the second planetary gear 10 is comprised of a sun gear 26, a plurality of planet or pinion gears 28 and an annulus or ring gear 20. The annulus gear 20 of the second planetary gear set 10 is connected to the pinion gears 14 of the first planetary gear set 8 and the drive sprocket 22 through the output drum 24. The pinion gears 28 are supported by a carrier 30 which in turn is rigidly connected to the sun gear 26 of the first planetary gear set 8 through the third stage input shaft 4.

In addition, the carrier 30 is selectively coupled to the third stage input shaft 4 by a third speed clutch C3. The sun gear 26 of the second planetary gear set 10 is selectively connected to the input shaft X1 by virtue of a reverse clutch C4.

The reverse sun gear shaft 6 may be selectively anchored to a transmission casing 52 by means of a fourth speed band brake B3. Counterclockwise rotation of the reverse sun gear shaft 6 is restricted by a second speed brake B2. Located between the second speed brake B2 and the reverse sun gear shaft 6 is a one way clutch F3 that may act in the course of second-to-third gear shift. The carrier 30 of the second planetary gear set 10 is selectively anchored against rotation by means of a low/reverse brake B1.

Counterclockwise rotation of the carrier 30 is restricted by a one way clutch F2 which may act in the process of first-to-second gear shift. Provided between the forward clutch C2 and the sun gear 12 of the first planetary gear set 8 is a one way clutch F1 that may act in the process of third-to-fourth gear shift.

The drive sprocket 22 is drivingly connected to a driven sprocket 34 of a secondary shift part 32 by means of a chain or the like so as to transfer the rotary force of the primary shift part 2 to the secondary shift part 32. The driven sprocket 34 is connected to a third planetary gear set 38 which includes a carrier 40, a sun gear 42, a plurality of planet or pinion gears 44 and an annulus or ring gear 46, each remaining in the same meshing relationship as in the first and second planetary gear sets 8, 10 described above.

Provided between the driven sprocket 34 and the sun gear 42 are an overdrive unit clutch C5 and a one way clutch F4 which may grow active during the course of fourth-to-fifth gear shift. Moreover, the sun gear 42 may be selectively anchored to the transmission casing 52 by means of a fifth speed brake B4. A final reduction planetary gear set 50 is used to transfer the rotary force of the third planetary gear set 38 to a differential gear 54 and, ultimately, to an output shaft X2.

FIG. 2 shows operative conditions of the clutches and the brakes in various shift ranges. Symbol O indicates that the clutches or brakes remain in an engaged condition, with symbol X indicating the clutches or brakes disengaged. Furthermore, the clutches are designated by symbol C, the brakes by symbol B and the one way clutches by symbol F in the table given in FIG. 2.

The hydraulic control system explain below with reference to FIGS. 3 through 14 helps control the behavior of the overrun forward clutch C1, the forward clutch C2, the third speed clutch C3, the reverse clutch C4, the overdrive unit clutch C5, the low/reverse brake B1, the second speed brake B2, the fourth speed brake B3, and the fifth speed brake B4. Actuation or non-actuation of the clutches and the brakes in each of the shift ranges is self-explanatory in FIG. 2 and, therefore, no further description is offered.

Figure 3:
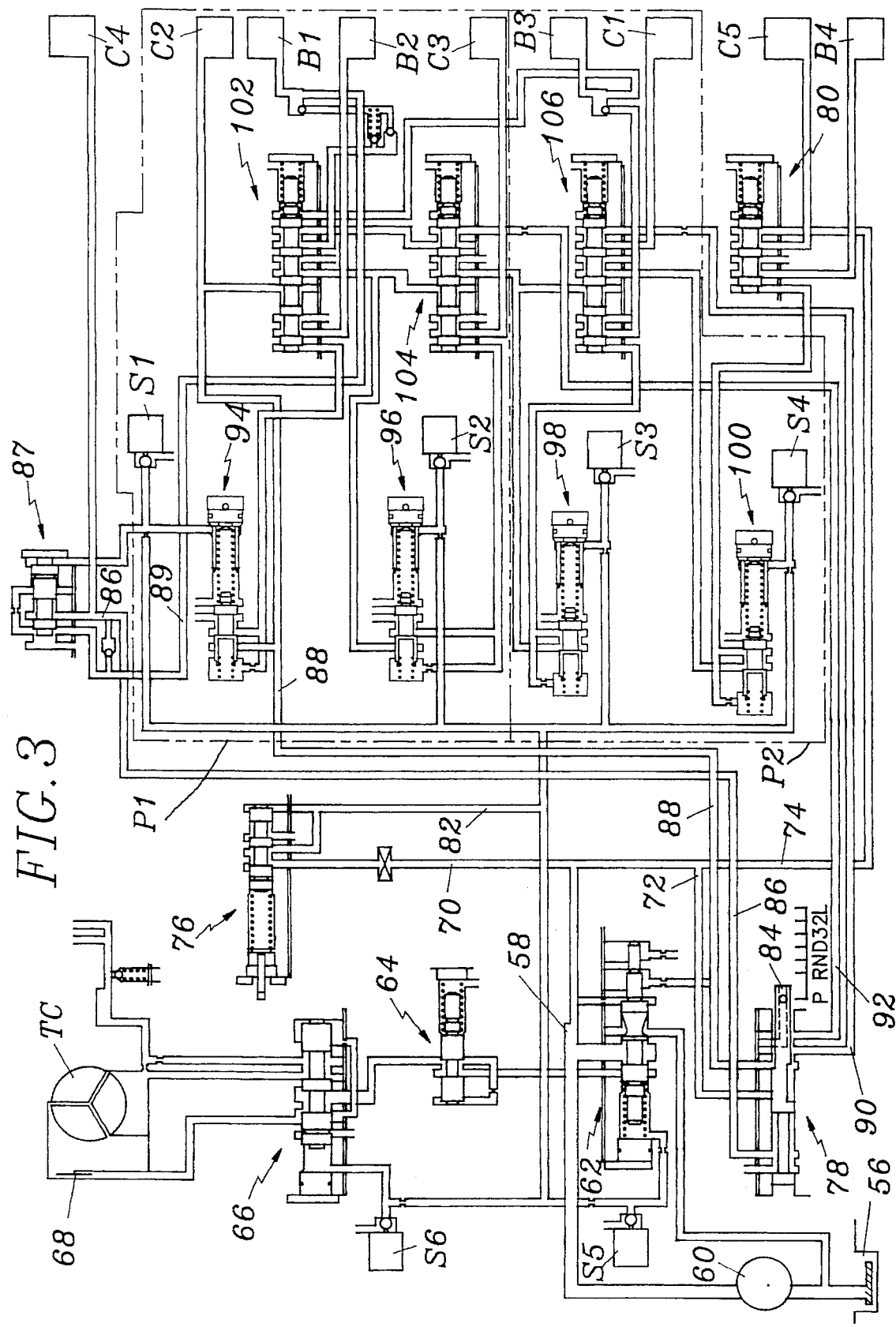
FIG. 3 provides a circuit diagram of the hydraulic control system in accordance with the present invention, with the manual selector valve in a parking position.

Referring to FIG. 3, there is shown a circuit diagram of the hydraulic control system in accordance with the present invention, with the manual selector valve in a parking position. The hydraulic control system includes an oil pump 60 for producing a pressurized fluid by pumping a working fluid in an oil fan 56, a regulator valve 62 adapted to adjust the pressure of the working fluid to thereby create a drive fluid of a low, middle or high pressure depending upon the duty ratio of the solenoid valve S5.

The drive fluid in a main pressure line 58 is supplied to the torque converter TC via a converter feed valve 64, controlled by a solenoid valve S6, having a function of regulating the pressure of the fluid supplied into the torque converter TC and a damper clutch control valve 66 adapted to change the flow path of the fluid supplied into the torque converter TC to the converter feed valve 64 to selectively engage and disengage a damper clutch or lock-up clutch 68.

The drive fluid in the main pressure line 58 is distributed to a pressure reducing valve 76 for diminishing the pressure of the drive fluid to produce a low pressure pilot fluid directed to the regulator valve 62 and the damper clutch control valve 66 via a pressure reducing line 82, a manual valve 78 and an overdrive unit valve 80 through first, second and third branch lines 70, 72 and 74, respectively.

The manual valve 78 is provided with a valve spool 84 actuated by a driver to select a specific shift range out of, e.g., parking P, reverse R, neutral N, and drive ratios III, II and I. The drive fluid from the second branch line 72 returns to the oil fan 56 through an outlet(shown in phantom lines) formed at the center of a valve spool 84 along its axial line when the manual valve is in parking P. While the second branch line 72 is fluid communicated with a reverse line 86 in case of reverse R, the drive fluid in the second branch line 72 cannot pass through the manual valve 78 in the case of neutral N. Further, the drive fluid is directed to a forward line 88 via the manual valve 78 in case of drive D, and the drive fluid is directed to both the forward line 88 and a first low drive ratio line 90 in case of the first low drive ratio III. In case of second and third low drive ratios II and I, the drive fluid is directed to a second low drive ratio line 92 in addition to the forward line 88 and the first low drive ratio line 90.

The hydraulic control system in accordance with the present invention is provided with first to fourth shift valves 94, 96, 98 and 100 for regulating the pressure of the working fluid and supplying the working fluid of the regulated pressure to friction elements, e.g., a second speed brake B2, a third speed clutch C3, a fourth speed band brake B3 and a fifth speed brake B4 to engage them sequentially or alternately. In addition, the first to fourth shift valves 94, 96, 98 and 100 are adapted to prevent the clutches and the brakes from slipping by regulating the pressure of the drive fluid depending upon the torque of the gear train. First to fourth normally closed solenoid valves S1, S2, S3 and S4, controlled by a transmission control unit(not shown), are associated with each of the first to fourth shift valves for controlling the movement of the shift valves in correspondence to a vehicle speed and a throttle opening degree, thereby regulating the pressure of the drive fluid directed to the second speed brake B2, the third speed clutch C3, the fourth speed band brake B3 and the fifth speed brake B4 from the shift valves.

Further, the first to the third shift valves 94, 96 and 98 are fluid communicated with the second speed brake B2, the third speed clutch C3 and the fourth speed band brake B3 via the second to the third speed valves 102,104 and 106, and the fourth shift valve 100 is fluid communicated with the fifth speed brake B4 via an overdrive unit valve 80. A reverse gear inhibitor valve 87, controlled by the first solenoid valve S1, is adapted to prevent establishment of the reverse gear ratio when the manual selector valve 78 is inadvertently shifted to the reverse position R during a forward travel of the vehicle.

Figure 4A:
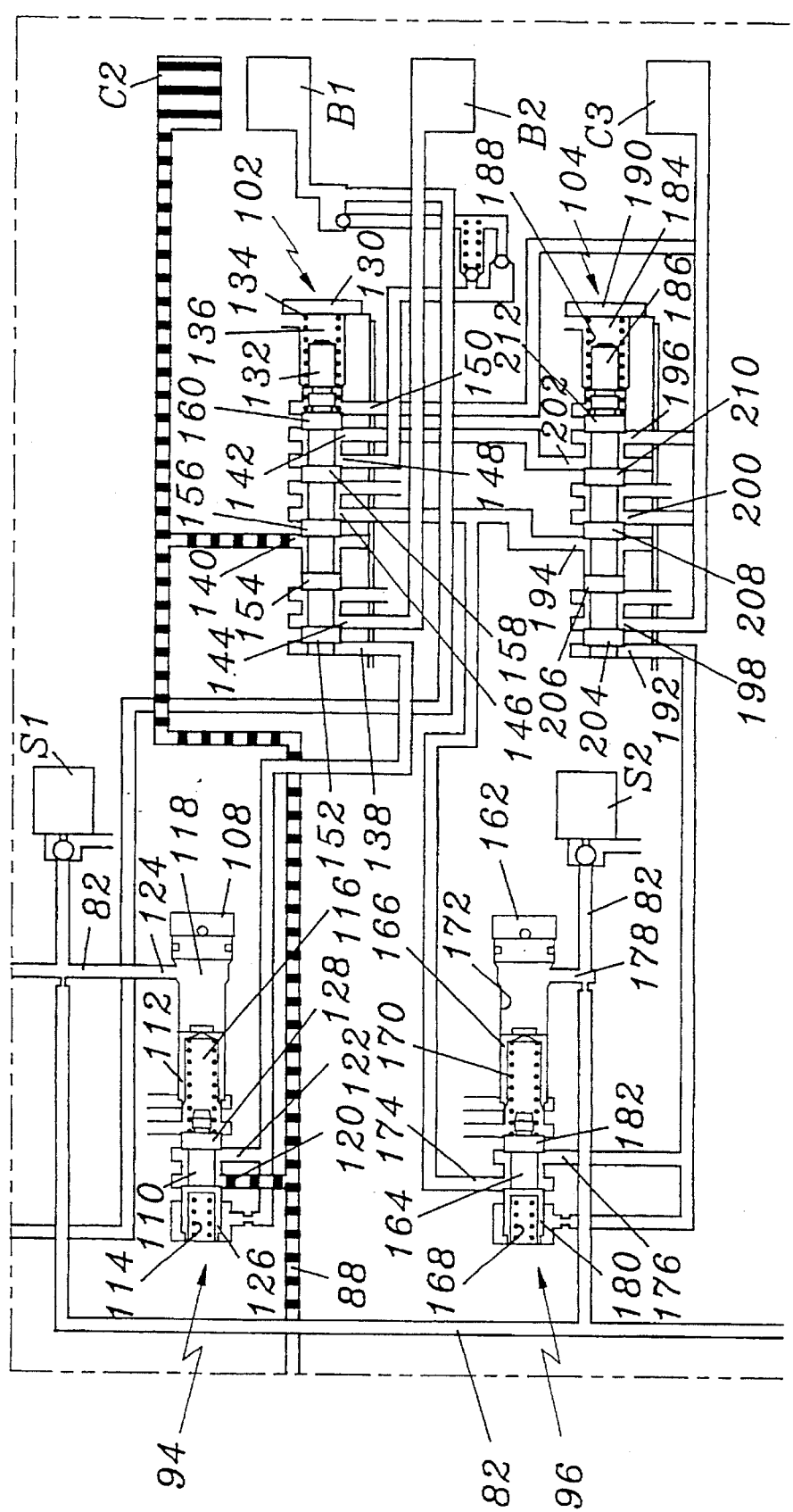
FIGS. 4A and 4B show on an enlarged scale the upper shift control part(P1) and the lower shift control part(P2) enclosed in the double-dotted lines shown in FIG. 3.

As shown in FIG. 4A, the first shift valve 94, for regulating the pressure of the working fluid and supplying the working fluid of regulated pressure to the second speed brake B2, includes a valve housing 108, first and second valve spools 110 and 112 slidably fitted into the valve housing 108 in a spaced apart relationship with each other for movement between a first position blocking up flow of the working fluid and a second position allowing the working fluid to flow therethrough, and first and second springs 114 and 116 retained within the valve housing 108 to bias the first and the second valve spools 110 and 112 into one of the first and second positions, wherein the first spring 114 has a spring constant no greater than that of the second spring.

The valve housing 108 has a bore 118, an inlet port 120 for introducing the working fluid into the bore 118 from the forward line 88, an outlet port 122 selectively connectable to the inlet port 120 and fluid communicated with the second speed valve 102, and a pilot port 124 in fluid communication with the first solenoid valve S1 via the pressure reducing line 82. The first valve spool 110 has a first land 126 for selectively closing and opening the inlet port 120 and a second land 128 axially spaced apart from the first land 126.

Figure 5A:
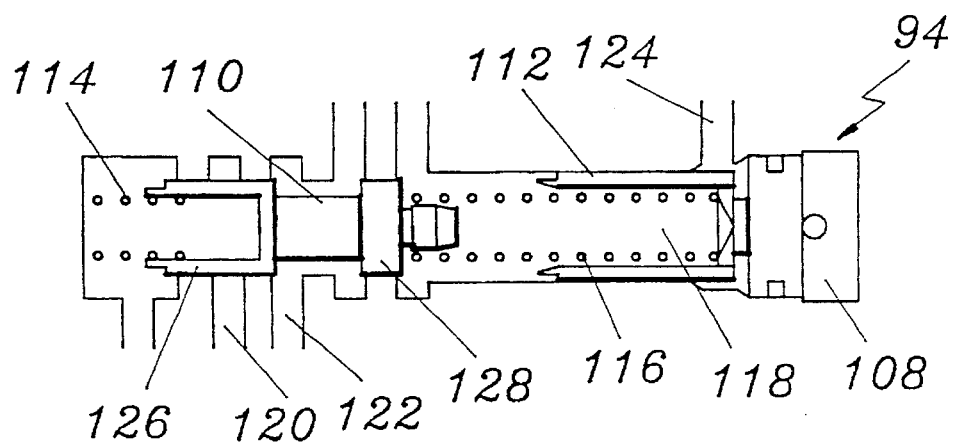
FIGS. 5A and 5B depict the first shift valve forming a part of the upper shift control part(P2) shown in FIG.4A, with the first shift valve moved to the rightside position in FIG. 5A and to the leftside position in FIG. 5B.

FIG. 5A depicts the first shift valve forming a part of the upper shift control part(P1) shown in FIG. 3, with the first shift valve moved to the rightside position. As shown, the low pressure fluid is discharged outward through the pilot port 124 since the first solenoid valve S1 is "on"; and, then, the valve spools 110 and 112 are biased rightward by the springs 114 and 116. Therefore, the inlet port 120 is closed by a land 126 of the first valve spool 110. When the first solenoid valve S1 is "off", the low pressure fluid is introduced into the bore 118 via the pilot port 124; and, then, the valve spools 110 and 112 overcome the recovering force of the springs 114 and 116 to move leftward, thereby causing the working fluid to flow through the inlet port 120, the outlet port 122 and the first shift valve 94.

At this time, since the first solenoid valve repeats "on" and "off" depending upon a predetermined duty ratio, the first and the second valve spools 110 and 112 of the first shift valve 94 reciprocate to repeatedly close and open the inlet port 120. Thus, when the time during the inlet port 120 being open is longer than that of the inlet port 120 being closed, the pressure of the working fluid supplied into the second speed brake B2 from the outlet port 122 becomes higher; whereas when the time during the inlet port 120 being open is shorter than that of the inlet port 120 being closed, the pressure of the working fluid becomes lower.

Figure 5B:
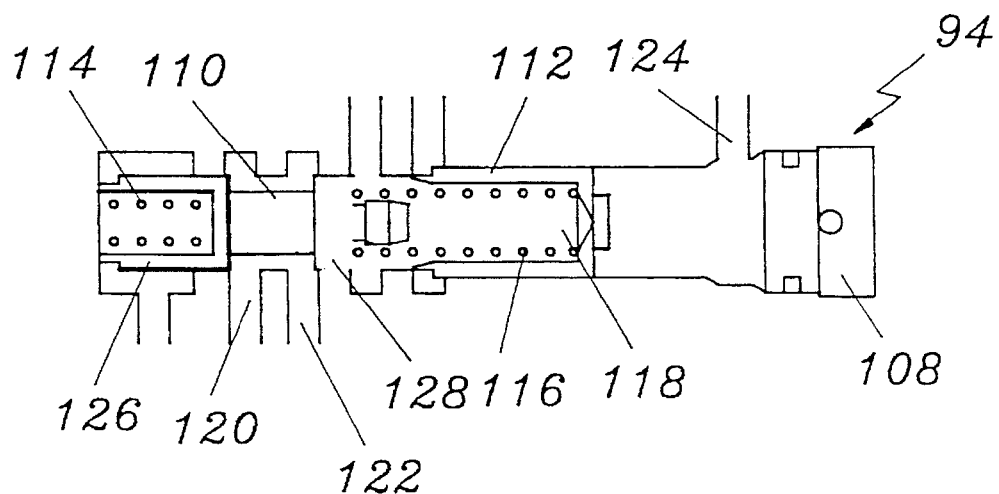

When the first solenoid valve S1 is fixed to "on", the low pressure fluid is discharged outward via the pressure reducing line 82; and, then, the second valve spool 112 moves rightward by the second spring 116, as shown in FIG. 5B. Also, the first valve spool 110 moves rightward by the first spring 114, wherein the moving speed of the first valve spool 110 is slower than that of the second valve spool 112, since the resilience of the first spring 114 is smaller than that of the second spring 116. This slowness of the moving speed of the first valve spool 110 causes the pressure of the fluid to be gradually released to reduce a shift shock during a down shift from the second speed to the first speed.

Referring back to FIG. 4A, the second speed valve 102 includes a valve housing 130, a valve spool 132 slidably fitted into the valve housing 130 for movement between first and second positions and a spring 134 for biasing the valve spool 132 into the first position. The valve housing 130 of the second speed valve 102 has a bore 136, a first inlet port 138 connected to the outlet port 122 of the first shift valve 94, a second inlet port 140 connected to the forward fluid line 88 for the introduction of the working fluid, a third inlet port 142 adapted to receive the working fluid supplied from the third speed valve 104 and the fourth speed valve 106, a first outlet port 144 selectively connectable to the first inlet port 138 and leading to the second speed brake B2, a second outlet port 146 selectively connectable to the second inlet port 140 and leading to the second shift valve 96 and the third speed valve 104, a third outlet port 148 selectively connectable to the third inlet port 142 and leading to the low/reverse brake B1, and a fourth outlet port 150 adapted to selectively communicate with the third inlet port 142 and leading to the fourth speed band brake B3.

Further, the valve spool 132 of the second speed valve 102 has first to fifth lands 152, 154, 156, 158 and 160 spaced apart from one another along a length of the valve spool 132, each of the first to fifth lands adapted to cooperate with the first to third inlet ports 138, 140 and 142 and the first to fourth outlet ports 144, 146, 148 and 150 of the second speed valve 102 to control the flow of the working fluid through the second speed valve 102.

Figure 6A:
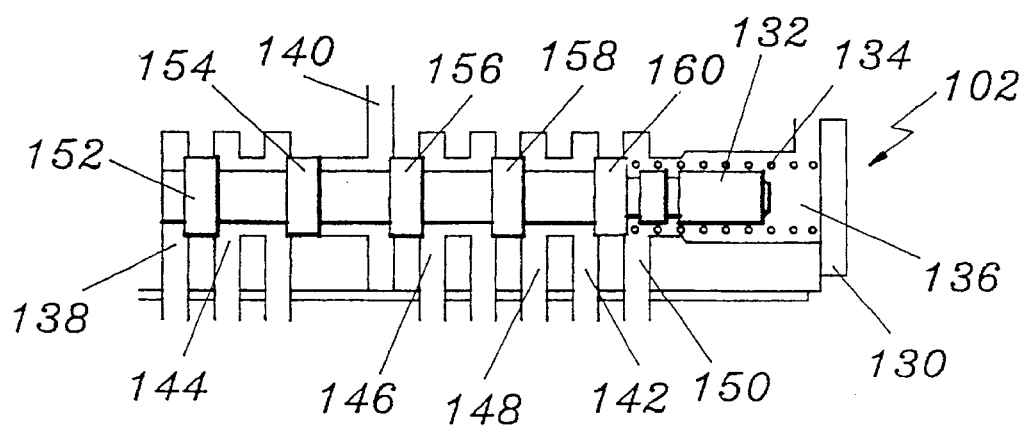
FIGS. 6A and 6B represent the second shift valve forming a part of the upper shift control part(P1) shown is FIG. 4A, with the second shift valve moved to the rightside position in FIG. 6A and to the leftside position in FIG. 6B.

As shown in FIG. 6A, the valve spool 132 of the second speed valve 102 is normally biased to the first position, i.e., leftward, by a spring 134. At this time, the first outlet port 144 is closed by the first land 152 of the valve spool 132 from the first inlet port 138; and the working fluid from the first shift valve 94 is not supplied into the second speed brake B2. Similarly, the second outlet port 146 is closed by the third land 156 of the valve spool 132 from the second inlet port 140. At the same time, since the third inlet port 142 is communicated with the third outlet port 148, but closed from the fourth outlet port 150, the working fluid from the second low speed line 92 is supplied to the low/reverse brake B1 through the third inlet port 142 and the third outlet port 148.

Figure 6B:
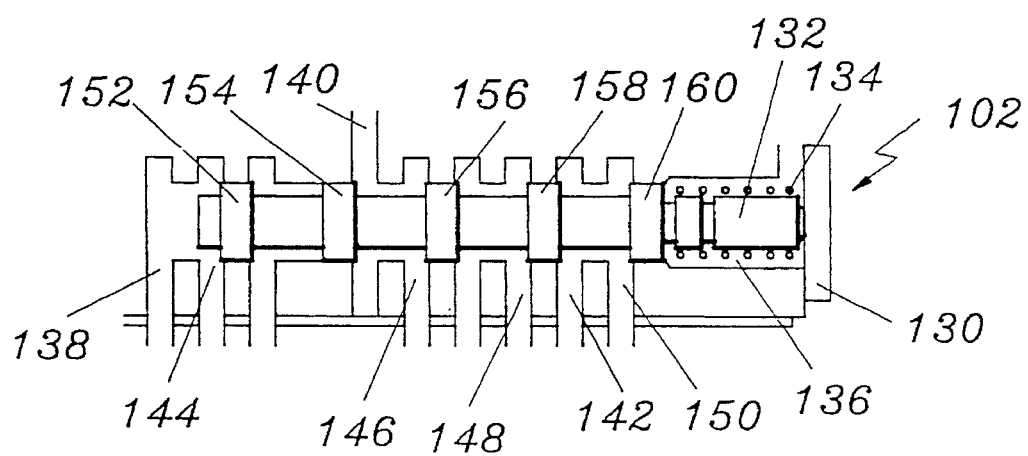

When the working fluid is supplied to the second speed valve 102 via the first inlet port 138 from the first shift valve 94, the valve spool 132 overcomes the recovering force of the spring 134 to move to the second position, i.e., rightward, as shown in FIG. 6B. Therefore, the working fluid from the first shift valve 94 is directed to the second speed brake B2 through the first inlet port 138 and the first outlet port 144 to engage the second speed brake B2. At the same time, the working fluid in the forward line 88 is distributed to the second shift valve 96 and the third speed valve 104 via the second inlet port 140 and the second outlet port 146, and the third inlet port 142 is communicated with the fourth outlet port 150; thus, the working fluid from the second low speed line 92 is directed to the fourth speed band brake B3.

Referring back to FIG. 4A, the second shift valve 96, for regulating the pressure of the working fluid and supplying the working fluid of regulated pressure to the third speed clutch C3 to establish a shift between the second forward gear ratio and the third forward gear ratio, includes a valve housing 162, first and second valve spools 164 and 166 slidably fitted into the valve housing 162 in a spaced apart relationship with each other and first and second springs 168 and 170 retained within the valve housing 162 to bias the first and the second valve spools 164 and 166 into one of the first and second positions, wherein the first spring 168 has a spring constant no greater than that of the second spring 170.

The valve housing 162 of the second shift valve 96 has a bore 172, an inlet port 174 connected to the second outlet port 146, an outlet port 176 selectively connectable to the inlet port 174 and leading to the third speed valve 104, a pilot port 178 in communication with the second solenoid valve S2. Further, the first valve spool 164 of the second shift valve 96 has first and second lands 180 and 182 spaced apart from each other. The above described second shift valve 96 is operated in a similar manner to that of the first shift valve 94.

The third speed valve 104 includes a valve housing 190, and a valve spool 186 slidably fitted in the valve housing 184 and movable between first and second positions, and a spring 188 for biasing the valve spool 186 to the first position. The valve housing 190 of the third speed valve 104 has a bore 184, a first inlet port 192 leading to the outlet port 176 of the second shift valve 96, a second inlet port 194 leading to the second outlet port 146 of the second speed valve 102, a third inlet port 196 directly connected to the second low speed line 92, a first outlet port 198 selectively connectable to the first inlet port 192 of the third speed valve 104, a second outlet port 200 selectively communicating with the second inlet port 194 of the third speed valve 104 and leading to the third shift valve 98 and the fourth speed valve 106 and a third outlet port 202 selectively communicating with the third inlet port 196 of the third speed valve 104 and leading to the third inlet port 142 of the second speed valve 102.

Further, the valve spool 186 of the third speed valve 104 has first to fifth lands 204, 206, 208, 210 and 212 spaced apart from one another along a length of the valve spool 186, each of the first to fifth lands adapted to cooperate with the first to third inlet ports 192, 194 and 196 and the first to third outlet ports 198, 200 and 202 to control the flow of the working fluid through the third speed valve 104.

Figure 4B:
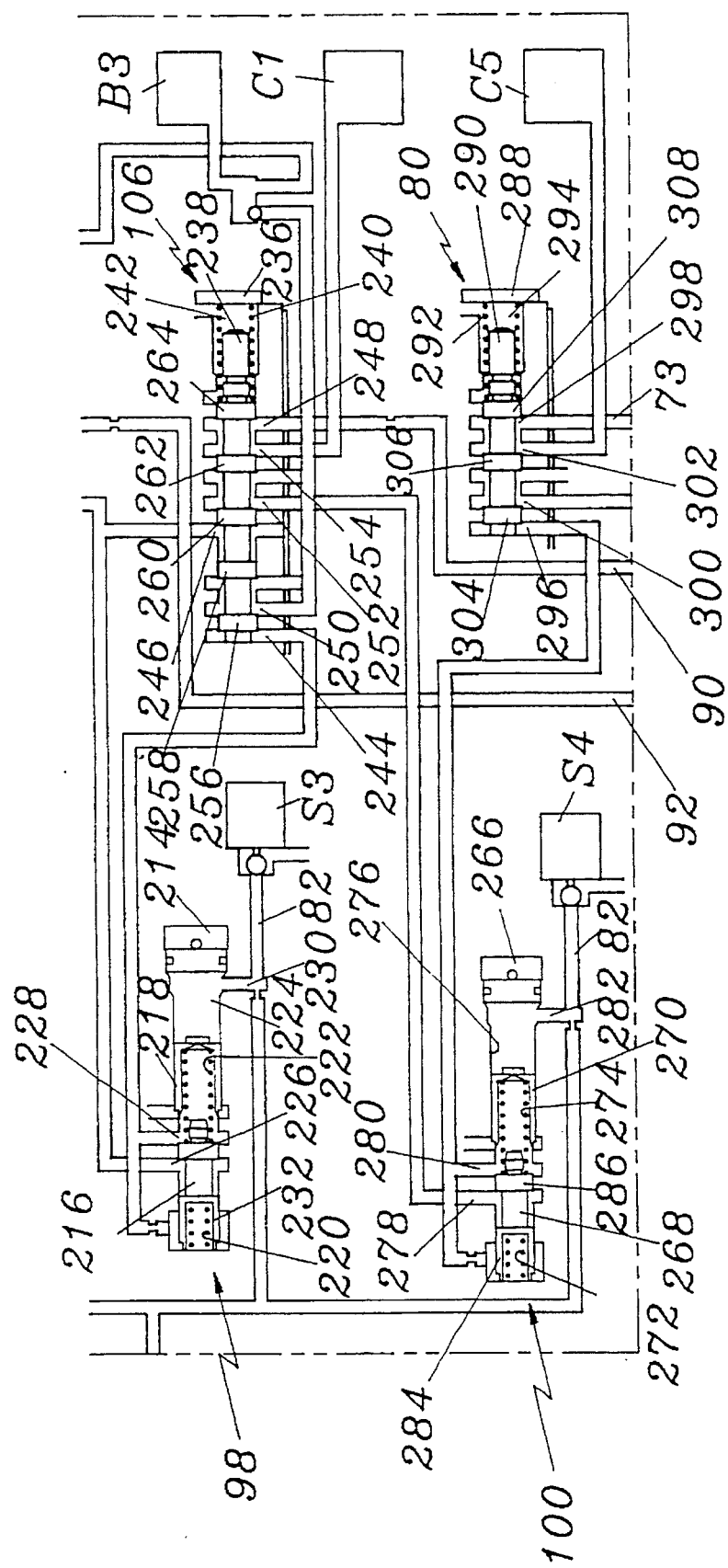

Referring to FIG. 4B, the third shift valve 98, for regulating the pressure of the working fluid and supplying the working fluid of the regulated pressure to the fourth speed band brake B3 to establish a shift between the third forward gear ratio and the fourth forward gear ratio, includes a valve housing 214, first and second valve spools 216 and 218 slidably fitted into the valve housing 214 in a spaced apart relationship with each other, and first and second springs 220 and 222 retained within the valve housing 214 to bias the first and the second valve spools 216 and 218 rightward, wherein the first spring 220 has a spring constant no greater than that of the second spring 222.

The valve housing 214 has a bore 224, an inlet port 226 leading to the second outlet port 200 of the third speed valve 104, an outlet port 228 selectively communicating with the inlet port 226 leading to the fourth speed valve 106, and a pilot port 230 in communication with the third solenoid valve S3 via the pressure reducing line 82. Further, the first valve spool 216 has first and second lands 232 and 234 spaced apart from each another and is adapted to selectively open or close the inlet port 226. The above third shift valve 98 is also operated in a manner similar to that of the first shift valve 94, except that the inlet port 226 is communicated with the outlet port 228 when the first valve spool 216 moves rightward.

The fourth speed valve 106 includes a valve housing 236, a valve spool 238 slidably fitted within the valve housing 236 and movable between first and second positions, and a spring 240 for biasing the valve spool 238 to the first position. The valve housing 236 has a bore 242, a first inlet port 244 leading to the outlet port 228 of the third shift valve 98, a second inlet port 246 leading to the second outlet port 200 of the third speed valve 106, a third inlet port 248 directly connected to the first low speed line 90, a first outlet port 250 selectively connectable to the first inlet port 244, a second outlet port 252 selectively connectable to the second inlet port 246 and leading to the fourth shift valve 100, and a third outlet port 254 selectively communicating with the third inlet port 248.

Further, the valve spool 238 of the fourth speed valve 106 has first to fifth lands 256, 258, 260, 262 and 264 spaced apart from one another along a length of the valve spool 238, each of the first to fifth lands 256 to 264 adapted to cooperate with the first to third inlet ports 244, 246 and 248 and the first to third outlet ports 250, 252 and 254 to control the flow of the working fluid through the fourth speed valve 106.

As shown in FIG. 4B, the fourth shift valve 100, for regulating the pressure of the working fluid and supplying the working fluid of the regulated pressure to the fifth speed brake B4 to establish a shift between the fourth forward gear ratio and the fifth forward gear ratio, includes a valve housing 266, first and second valve spools 268 and 270 slidably fitted into the valve housing 266 in a spaced apart relationship with each other, and first and second springs 272 and 274 retained within the valve housing 266 to bias the first and the second valve spools 268 and 270 rightward, wherein the first spring 272 has a spring constant no greater than that of the second spring 274.

The valve housing 266 has a bore 276, an inlet port 278 leading to the second outlet port 252 of the fourth speed valve 106, an outlet port 280 selectively communicating with the inlet port 278 leading to the overdrive unit valve 80, and a pilot port 282 in communication with the fourth solenoid valve S4 via the pressure reducing line 82. Further, the first valve spool 268 has first and second lands 284 and 286 spaced apart from each another and is adapted to selectively open or close the inlet port 278. The above fourth shift valve 100 is also operated in a similar manner to that of the first shift valve 94, except that the inlet port 278 is communicated with the outlet port 280 when the first valve spool 268 moves rightward.

The overdrive unit valve 80 includes a valve housing 288, a valve spool 290 slidably fitted into the valve housing 288 for movement between first and second positions and a spring 292 for biasing the valve spool 290 into the first position. The valve housing 288 of the overdrive unit valve 80 has a bore 294, a first inlet port 296 connected to the outlet port 280 of the fourth shift valve 100, a second inlet port 298 directly connected to the oil pump 60, a first outlet port 300 selectively communicating with the first inlet port 296 and a second outlet port 302 selectively communicating with the second inlet port 298. Moreover, the valve spool 290 of the overdrive unit valve 80 has first to third lands 304, 306 and 308 spaced apart from one another along a length of the valve spool 290, each of the first to third lands 304, 306 and 308 adapted to cooperate with the first and second inlet ports 296 and 298 and the first and second outlet ports 300 and 302 to control the flow of the working fluid through the overdrive unit valve 80.

Hereinafter, how the five speed automatic transmission operates, depending upon the movement of the manual selector lever, will be described with reference to FIGS. 7 to 14.

Figure 7:
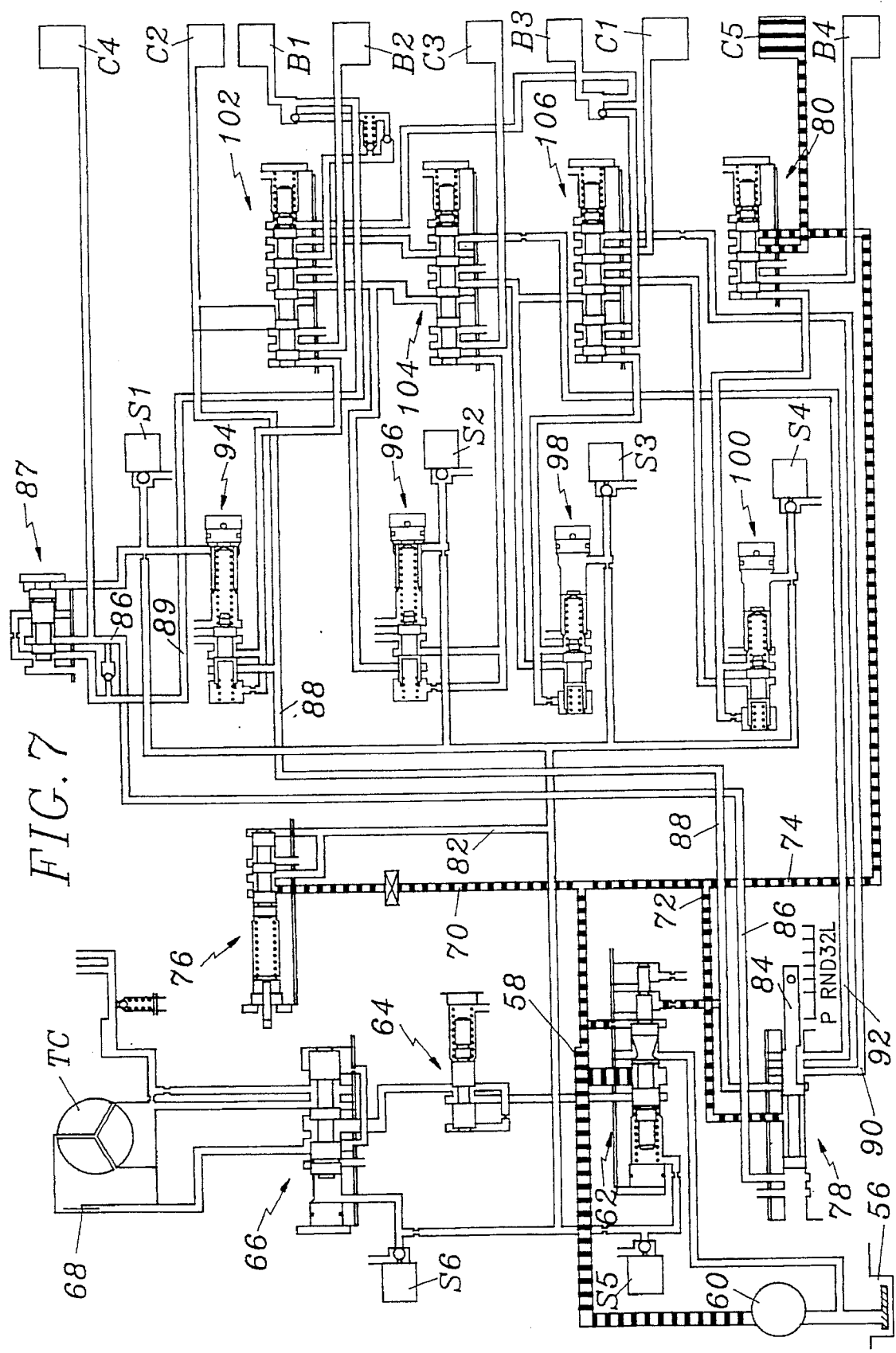
FIG. 7 exemplifies an operative condition of the hydraulic control system in a neutral range(N)

FIG. 7 illustrates an operative condition of the hydraulic control system in a neutral range(N), wherein stripes therein represent a distribution of the working fluid. As shown, the oil pump 60 is driven by the engine to supply the high pressure fluid to the main pressure line 58. The regulator valve 62 regulates the pressure of the working fluid in the main pressure line 58 depending upon the duty ratio of the solenoid valve S5 to cause the fluid pressure to vary with the pressure corresponding to each of the speed ranges (referred to as "line pressure"). Then, the working fluid is directed via the first branch line 70 to the pressure reducing valve 76 for reducing the pressure of the working fluid and distributing the working fluid to the first to the sixth solenoid valves S1 to S6 via the pressure reducing line 82.

The working fluid in the main pressure line 58 is also supplied into the manual valve 78 through the second branch line 72. However, since the valve spool 84 of the manual valve 78 has been moved to the neutral position N, the working fluid in the second branch line 72 cannot pass through the manual valve 78. In contrast, the working pressure in the main pressure line 58 is distributed to the overdrive unit clutch C5 via the third branch line 74 and the overdrive unit valve 80 to engage the clutch C5, thereby establishing the neutral range N. As shown in FIG. 2, all hydraulically actuated clutches and brakes are maintained at the released state in the neutral range N, except for the overdrive unit clutch C5.

Figure 8:
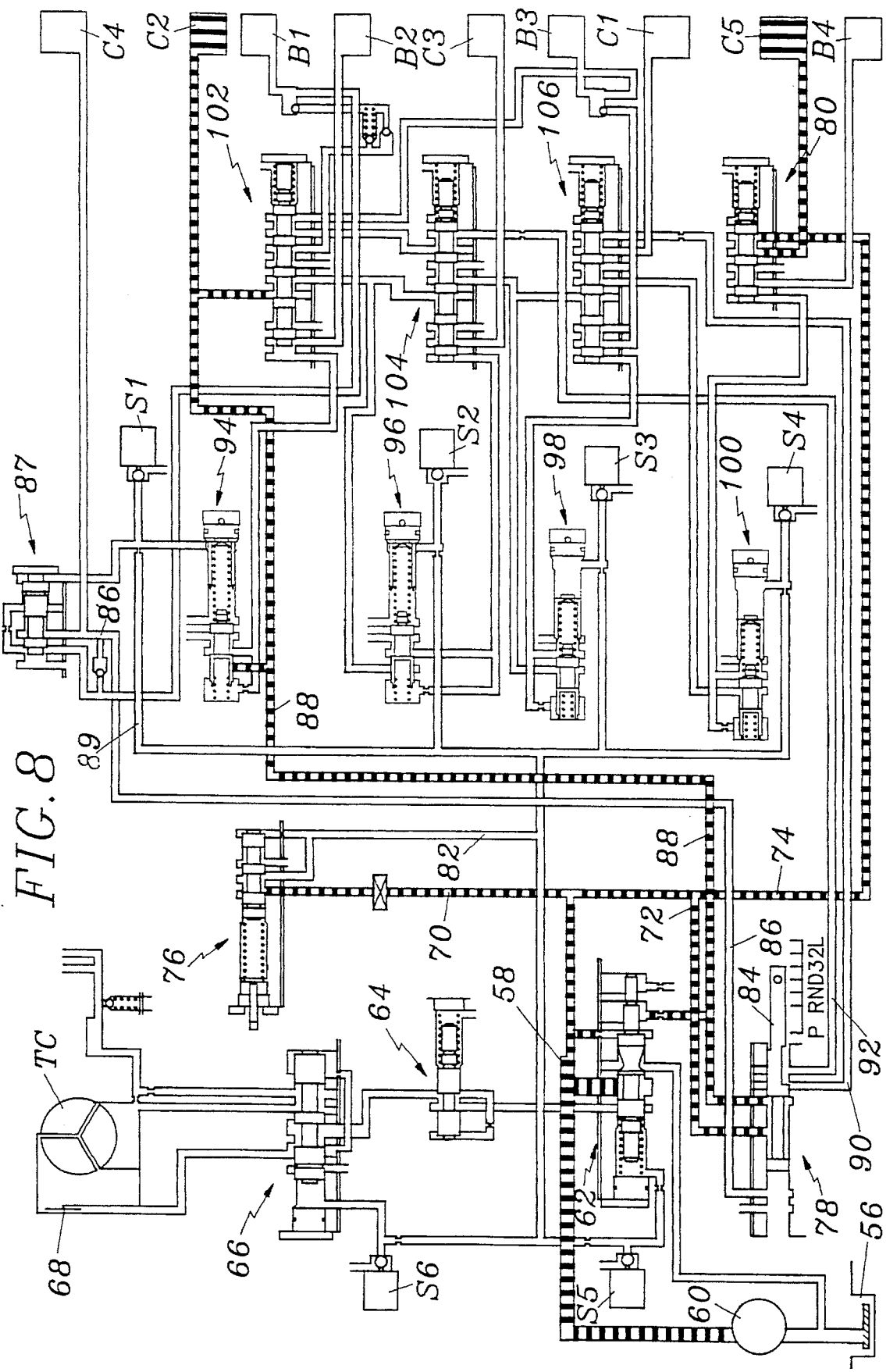
FIG. 8 describes an operative condition of the hydraulic control system at the first speed stage of a forward drive range(D)

FIG. 8 illustrates an operative condition of the hydraulic control system at the first speed stage of a forward drive range(D). As shown, the working fluid in the main pressure line 58 is distributed to the pressure reducing valve 76, the manual valve 78, and the overdrive unit valve 80 via the first to the third branch lines 70, 72 and 74, respectively. The working fluid supplied into the pressure reducing valve 76 is converted to the low pressure fluid to move to the first to the sixth solenoid valves S1 to S6 via the pressure reducing line 82, and the working fluid supplied into the overdrive unit valve 80 is directed to the overdrive unit clutch C5 to engage the clutch C5. On the other hand, the manual valve 78 makes the second branch line 72 to communicate with the forward drive line 88, thereby having the working fluid supplied to the forward clutch C2 via the forward drive line 88. The engagement of the overdrive unit clutch C5 and the forward clutch C2 establishes the first gear ratio of the forward drive range D. As shown in FIG. 2, in the first gear ratio of the forward drive range D, the overdrive unit clutch C5, the forward clutch C2, the first, the second and the fourth one way clutches F1, F2 and F4 are all actuated, and the first and the second solenoid valves S1 and S2 are maintained at the "on" state, thereby discharging the low pressure fluid from the pressure reducing line 82.

Figure 9:
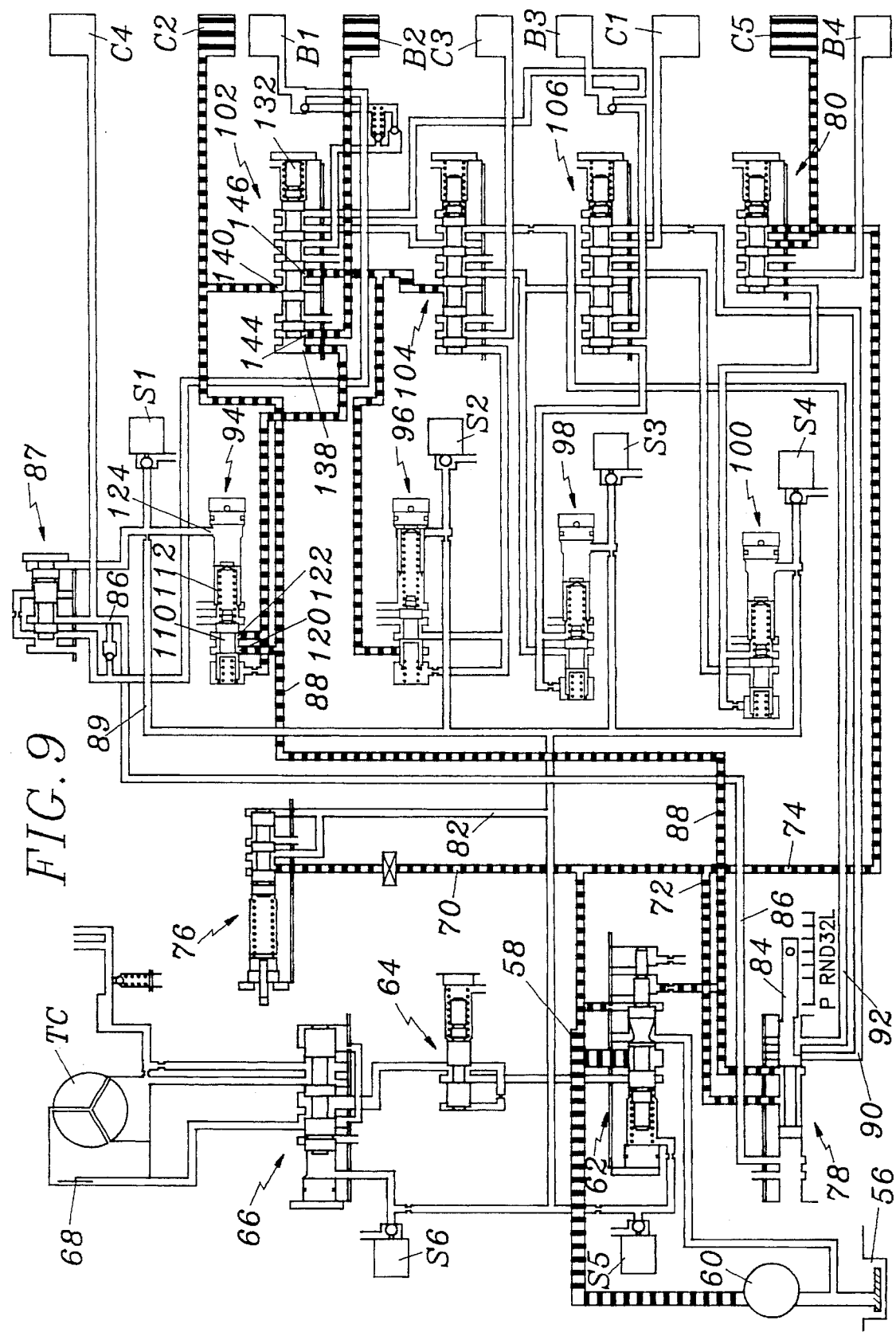
FIG. 9 forth an operative condition of the hydraulic control system at the second speed stage of the forward drive range(D)

FIG. 9 illustrates an operative condition of the hydraulic control system at the second speed stage of the forward drive range(D). As shown, the engagement of the overdrive unit clutch C5 and the forward clutch C2 in the second forward gear ratio is maintained in a similar manner to that of the first forward gear ratio. When the vehicle speed and the throttle opening degree are increased during the first speed stage, the first solenoid valve S1 is turned "off" to cause the low pressure fluid to enter the first shift valve 94 via the pilot port 124. Therefore, the first and the second spools 110 and 112 overcome the spring force to move rightward, thereby communicating the inlet port 120 with the outlet port 122. Thus, the working fluid supplied into the first inlet port 138 of the second speed valve 102 biases the valve spool 132 rightward, and, then is supplied into the second speed brake B2 via the first outlet port 144, thereby establishing the second forward gear ratio. At this time, the working fluid standing ready in the inlet port 140 of the second speed valve 102 is supplied to the second shift valve 96 and the third speed valve 104 via the second outlet port 146. As shown in FIG. 2, in the second forward gear ratio, the second speed brake B2, the forward clutch C2, the overdrive unit clutch C5, the first, the third and the fourth one way clutches F1, F3 and F4 are engaged.

Figure 10:
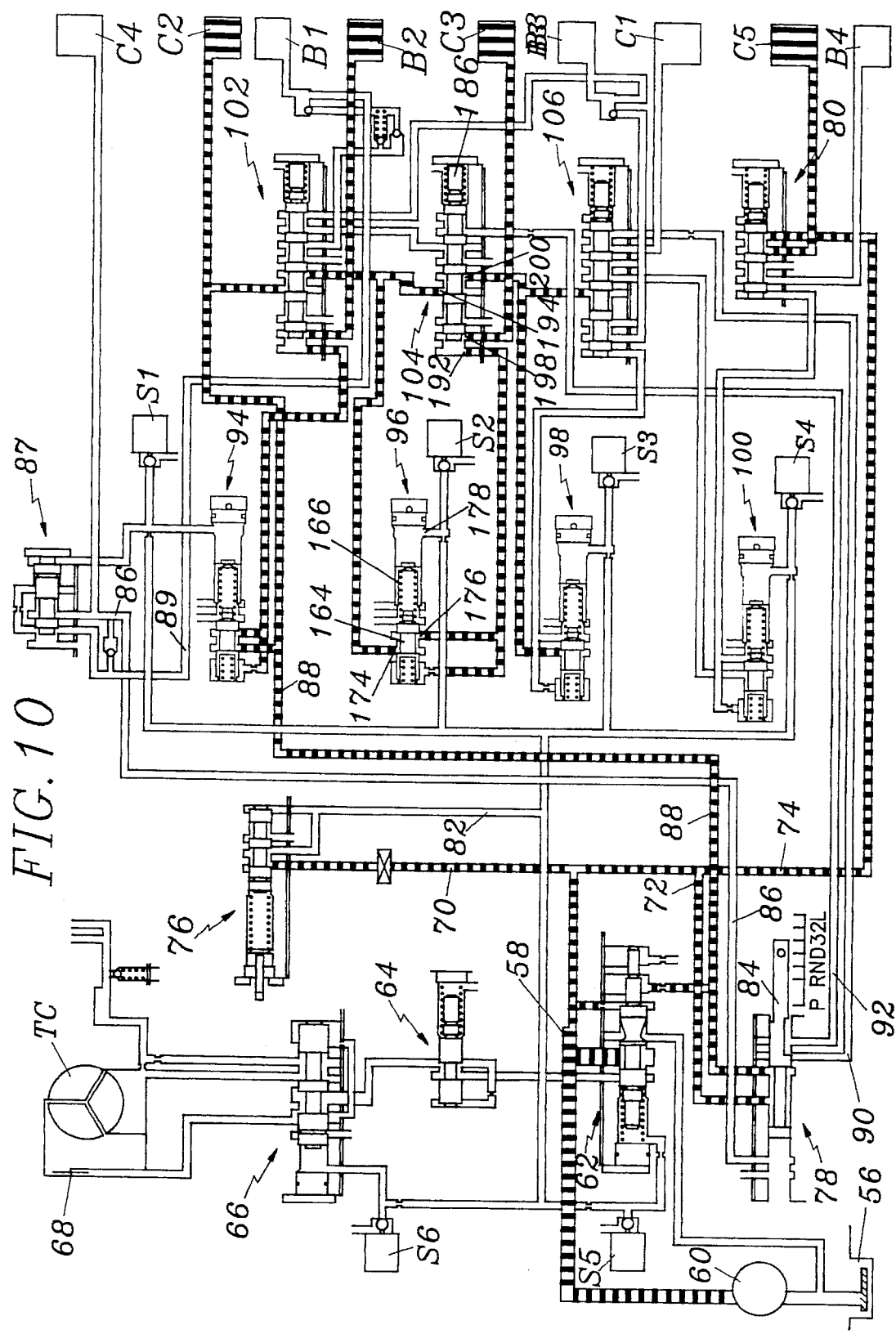
FIG. 10 explains an operative condition of the hydraulic control system at the third speed stage of the forward drive range(D)

FIG. 10 illustrates an operative condition of the hydraulic control system at the third speed stage of the forward drive range(D). As shown, the engagement of the overdrive unit clutch C5, the second speed brake B2 and the forward clutch C2 in the third forward gear ratio is maintained in a similar manner to that of the second forward gear ratio. When the vehicle speed and the throttle opening degree are increased during the second speed stage, the second solenoid valve S2 is turned "off" to cause the low pressure fluid to enter the second shift valve 96 via the pilot port 178. Therefore, the first and the second spools 164 and 166 overcome the spring force to move leftward, thereby communicating the inlet port 174 with the outlet port 176. Thus, the working fluid supplied into the first inlet port 192 of the third speed valve 104 biases the valve spool 186 rightward, and, then is supplied into the third speed clutch C3 via the first outlet port 198, thereby establishing the third forward gear ratio. At this time, the working fluid standing ready in the second inlet port 194 of the third speed valve 104 is supplied to the third shift valve 98 and the fourth speed valve 106 via the second outlet port 200. As shown in FIG. 2, in the third forward gear ratio, the second speed brake B2, the forward clutch C2, the overdrive unit clutch C5, the third speed clutch C3, the first and the fourth one way clutches F1 and F4 are engaged.

Figure 11:
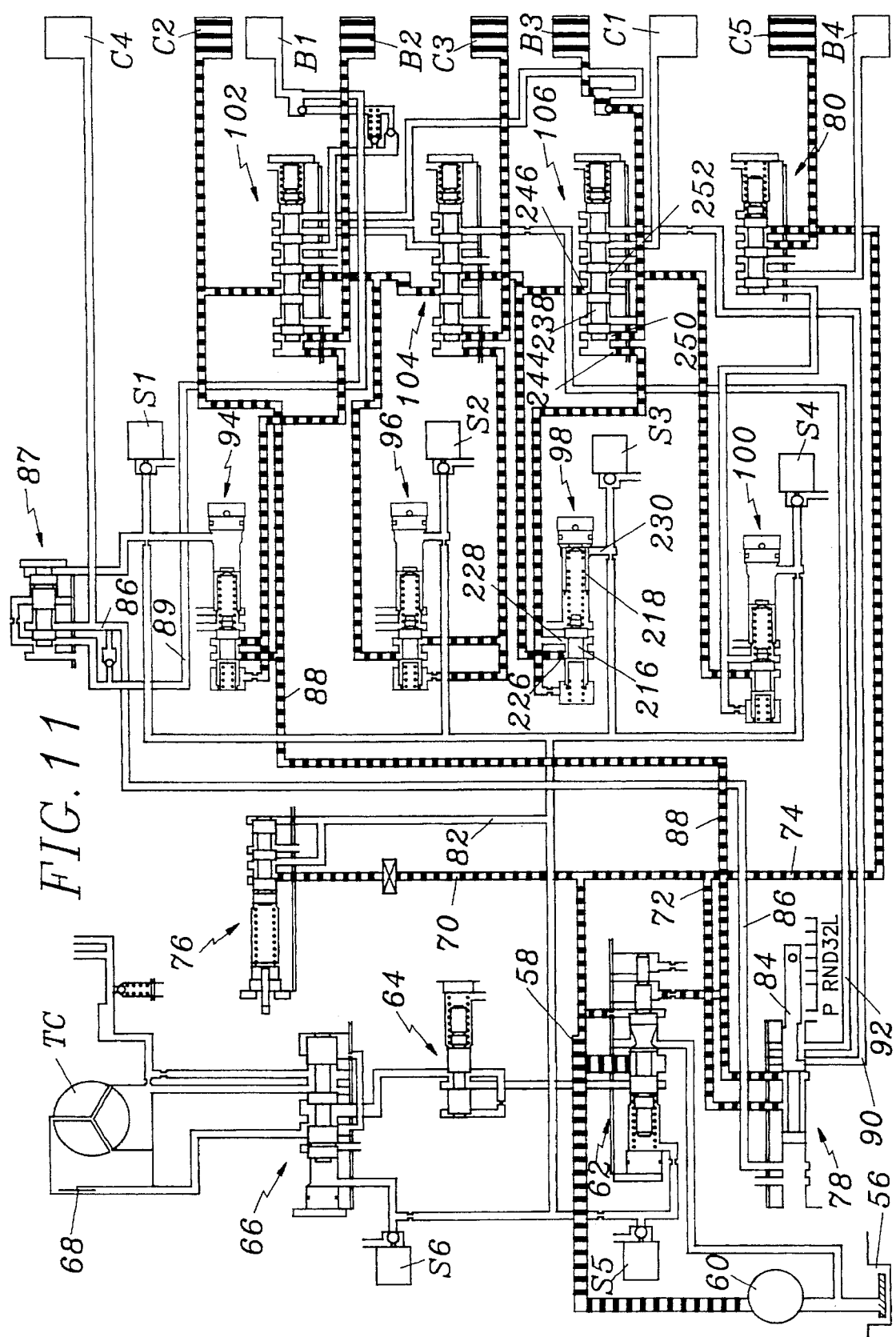
FIG. 11 exhibits an operative condition of the hydraulic control system at the fourth speed stage of the forward drive range(D)

FIG. 11 illustrates an operative condition of the hydraulic control system at the fourth speed stage of the forward drive range(D). As shown, the engagement of the overdrive unit clutch C5, the second speed brake B2, the forward clutch C2 and the third speed clutch C3 in the fourth forward gear ratio is maintained in a similar manner to that of the third forward gear ratio. When the vehicle speed and the throttle opening degree are increased during the third speed range, the third solenoid valve S2 is turned "on" to cause the low pressure fluid to be discharged from the third shift valve 98 via the pilot port 230. Therefore, the first and the second valve spools 216 and 218 are biased by the spring force to move rightward, thereby communicating the inlet port 226 with the outlet port 228. Thus, the working fluid supplied into the first inlet port 244 of the fourth speed valve 106 biases the valve spool 238 rightward, and, then is supplied into the fourth speed band brake B3 via the first outlet port 250, thereby establishing the fourth forward gear ratio. At this time, the working fluid standing ready in the second inlet port 246 of the fourth speed valve 106 is supplied to the fourth shift valve 100 via the second outlet port 252. As shown in FIG. 2, in the fourth forward gear ratio, the second speed brake B2, the forward clutch C2, the overdrive unit clutch C5, the third speed clutch C3, the fourth speed band brake B3, and the fourth one way clutch F4 are engaged.

Figure 12:
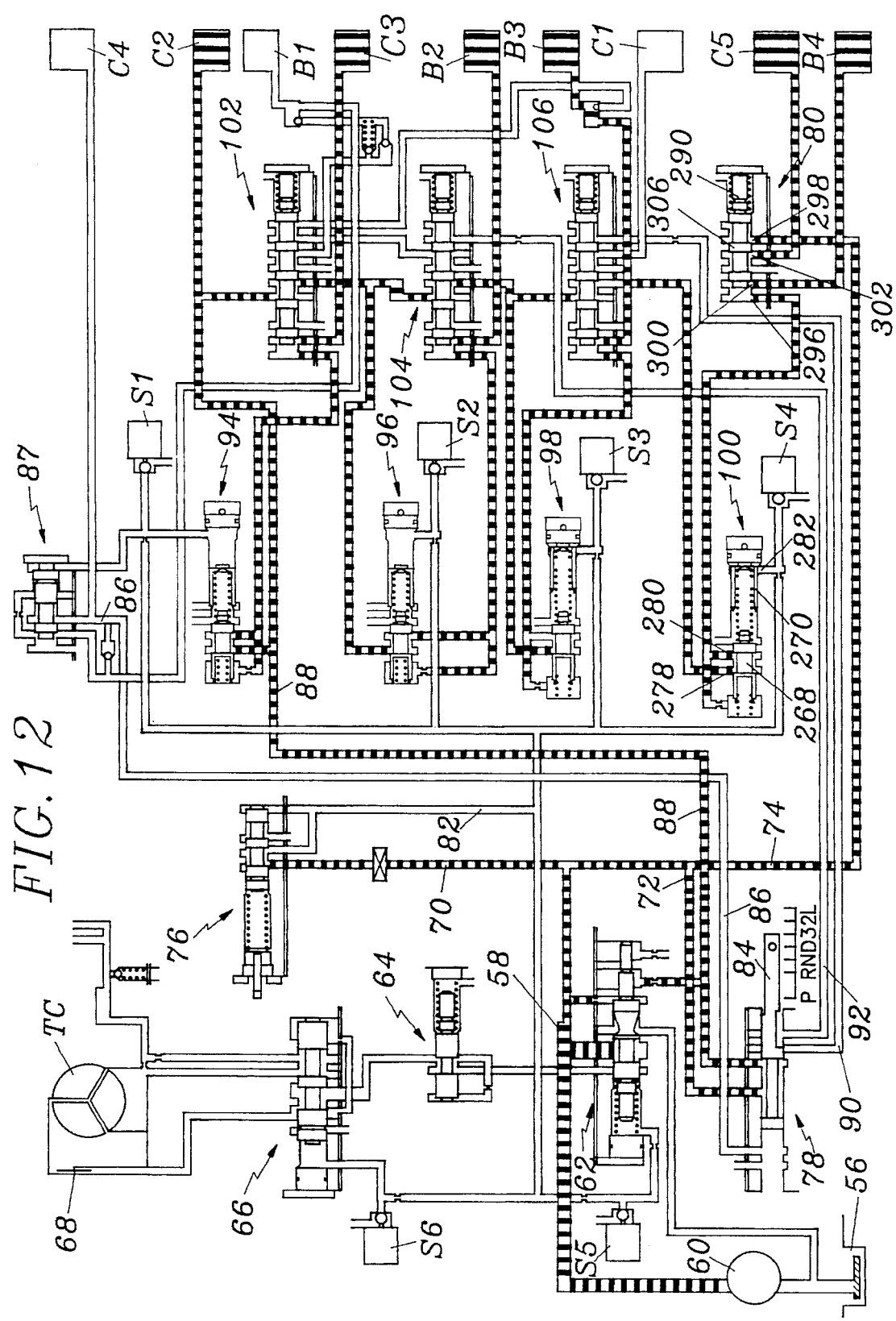
FIG. 12 demonstrates an operative condition of the hydraulic control system at the fifth speed stage of the forward drive range(D)

FIG. 12 illustrates an operative condition of the hydraulic control system at the fifth speed stage of the forward drive range(D). As shown, the engagement of the second speed brake B2, the forward clutch C2, the fourth speed brake B3 and the third speed clutch C3 in the fifth forward gear ratio is maintained in a similar manner to that of the third forward gear ratio; however, the overdrive unit clutch C5 is operated in a manner described below. When the driver turns on an overdrive switch during the fourth speed stage, the fourth solenoid valve S4 is turned "off" to discharge the low pressure fluid from the fourth shift valve 100 via the pilot port 282. Therefore, the first and the second valve spools 268 and 270 are biased by the spring force to move rightward to communicate the inlet port 278 with the outlet port 280. Thus, the working fluid supplied into the first inlet port 296 of the overdrive unit valve 80 biases the valve spool 290 rightward, and, then is supplied into the fifth speed brake B4 via the first outlet port 300. At this time, since the second inlet port 298 and the second outlet port 302 are blocked by the second land 306, the working fluid cannot be supplied to the overdrive unit clutch C5. As shown in FIG. 2, in the fifth forward gear ratio, the second speed brake B2, the forward clutch C2, the third speed clutch C3, the fourth speed band brake B3 and the fifth speed brake B4 are engaged, and the overdrive unit clutch C5 is disengaged. Further, the first to the fourth oneway clutches F1 to F4 are all disengaged.

Figure 13:
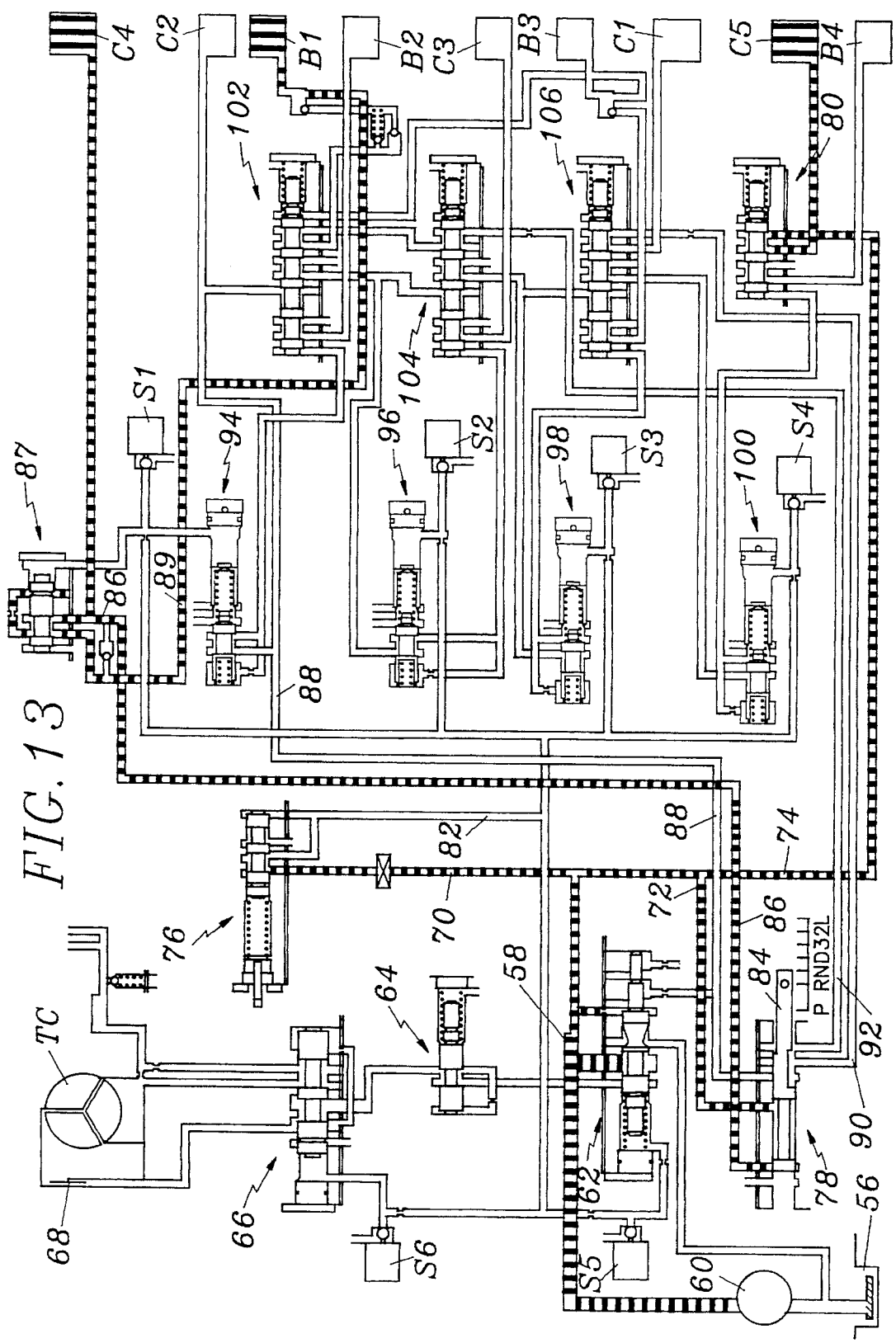
FIG. 13 displays an operative condition of the hydraulic control system in a reverse drive range(R)

FIG. 13 illustrates an operative condition of the hydraulic control system in the reverse drive range(R). As shown, the working fluid in the main pressure line 58 is distributed to the pressure reducing valve 76, the manual valve 78 and the overdrive unit valve 80 via the first to the third branch lines 70, 72 and 74, respectively. At this time, since the valve spool of the overdrive unit valve 80 is biased by the spring force to move leftward, the working fluid from the third branch line 74 is directly supplied to the overdrive unit clutch C5, thereby engaging the clutch C5. Moreover, the working fluid is supplied to the reverse gear inhibitor valve 87 via the reverse line 86 to engage the reverse clutch C4. However, the valve spool of the reverse gear ratio inhibitor valve 87 is biased by the pressure of the pilot fluid since the first solenoid valve S1 is turned "off" during the reverse drive range R. Therefore, the working pressure in the reverse line 86 is supplied into the low/reverse brake B1 via the bypass line 89 to engage the brake B1. As shown in FIG. 2, in the reverse gear ratio, the low/reverse brake B1, the reverse clutch C4 and the overdrive unit clutch C5 are engaged, and the other clutches and brakes are disengaged. Further, the second and fourth oneway clutches F2 and F4 are also engaged.

Figure 14:
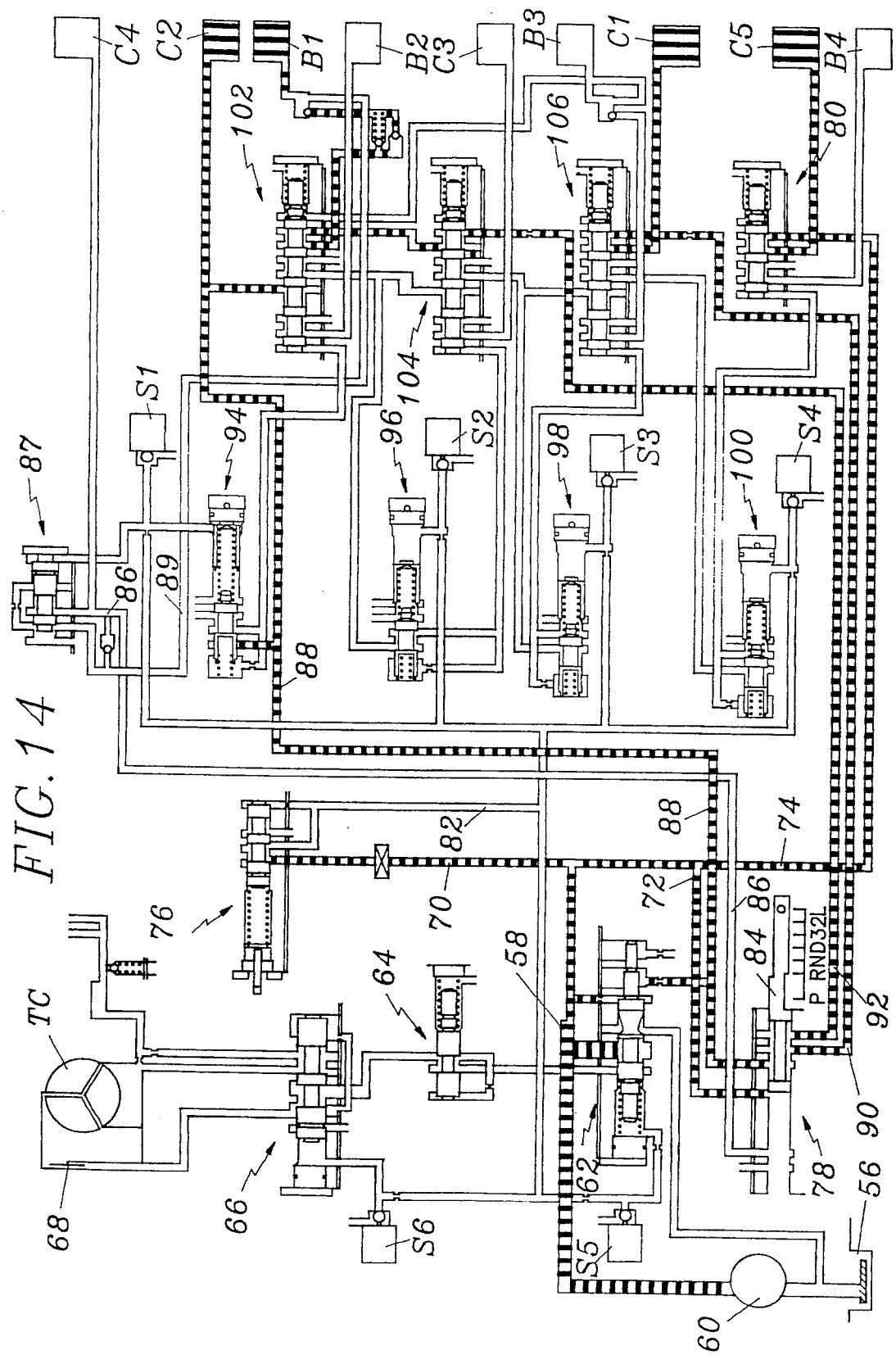
FIG. 14 constitutes an operative condition of the hydraulic ontrol system in a low range(L).

FIG. 14 illustrates an operative condition of the hydraulic control system in a low drive range(I). As shown, the working fluid in the main pressure line 58 is distributed to the pressure reducing valve 76, the manual valve 78 and the overdrive unit valve 80 via the first to the third branch lines 70, 72 and 74, respectively. At this time, since the valve spool of the overdrive unit valve 80 is biased by the spring force to move leftward, the working fluid from the third branch line 74 is directly supplied into the overdrive unit clutch C5 to engage the clutch C5. On the other hand, the working pressure supplied into the manual valve 78 is distributed to the forward line 88, the first low speed line 90 and the second low speed line 92, respectively. The working fluid in the forward line 88 is directly supplied to the forward clutch C2, the working fluid in the first low speed line 90 is supplied to the overrun forward clutch C1 via the fourth speed valve 106, and the working fluid in the second low speed line 92 is supplied to the low/reverse speed brake B1 via the second and the third speed valves 102 and 104. As shown in FIG. 2, in the low drive range I, the overdrive unit clutch C5, the forward clutch C2, the low/reverse brake B1 and the overrun forward clutch C1 are engaged, and the other clutches and brakes are disengaged. The first, the second and the fourth oneway clutches F1, F2 and F4 are also actuated.

On the other hand, a skip shift of the transmission may be accomplished when the vehicle speed varies sharply. For example, when a skip shift from the first forward gear ratio to the third forward gear ratio is accomplished, the second solenoid valve S2 is turned "off" to bias the valve spool of the second shift valve leftward, and the first solenoid valve S1 repeats "on" and "off" depending upon the duty ratio to bias the valve spool of the first shift valve 94, as shown in FIG. 8. Therefore, the working fluid in the forward line 88 is distributed to the second speed brake B2 via the first shift valve 94 and the second speed valve 102, and to the third speed clutch C3 via the second shift valve 96 and the third speed valve 104, thereby accomplishing the skip shift of first-to-third gear shift. The other skip shifts may also be accomplished by controlling the first to the fourth solenoid valves S1 to S4. Further, a down shift may be accomplished in a reverse order of the upshift described with reference to FIGS. 8 to 12.

Although the invention has been shown and described with respect to the exemplary embodiments, it should be understood by those skilled in the art that various changes, modifications and additions may be made without departing from the spirit and scope of the invention.

What is claimed is:

1. An electronic and hydraulic system of a five speed automatic transmission for a motor vehicle, the transmission including a torque converter, a gear train operatively coupled to the torque converter for rendering five forward and at least one reverse gear ratios effective, a plurality of friction elements each hydraulically operated to change a power delivery path through the gear train, and a hydraulic control system for selectively engaging and disengaging the friction elements to establish one of the gear ratios, wherein the hydraulic control system comprises:

an oil pump for producing a pressurized working fluid;

a selector valve manually operable to distribute the working fluid to a forward fluid line and a reverse fluid line;

first to fourth shift valves for regulating the pressure of the working fluid and supplying the working fluid of the regulated pressure to at least one of the friction elements, each of the shift valves including a valve housing, first and second valve spools slidably fitted into the valve housing in a spaced apart relationship with each other for movement between a first position blocking up flow of the working fluid and a second position allowing the working fluid to flow therethrough, and first and second springs retained within the valve housing to bias the first and the second valve spools into one of the first and second positions, wherein the first spring of each of the first to fourth shift valves has a spring constant no greater than that of the second spring corresponding thereto;

first to fourth solenoid valves associated with each of the first to the fourth shift valves for controlling the movement of the shift valves in correspondence to a vehicle speed and a throttle opening degree;

a second speed valve communicating with the first shift valve and the forward fluid line, the second speed valve movable between a first position blocking up the flow of the working fluid therethrough and a second position permitting the flow of the working fluid toward a friction element associated therewith so as to establish the second forward gear ratio;

a third speed valve communicating with the second shift valve and the second speed valve, the third speed valve movable between a first position blocking up the flow of the working fluid therethrough and a second position permitting the flow of the working fluid from the second speed valve toward a friction element associated therewith so as to establish the third forward gear ratio;

a fourth speed valve communicating with the third shift valve and the third speed valve, the fourth speed valve movable between a first position blocking up the flow of the working fluid therethrough and a second position permitting the flow of the working fluid from the third speed valve toward a friction element associated therewith so as to establish the fourth forward gear ratio; and an overdrive unit valve communicating with the fourth shift valve and the oil pump, the overdrive unit valve movable between a first position blocking up the flow of the working fluid therethrough and a second position permitting the flow of the working fluid from the fourth speed valve toward a friction element associated therewith so as to establish the fifth forward gear ratio.

2. The electronic and hydraulic system of a five speed automatic transmission as recited in claim 1, wherein the valve housing of each of the first to the fourth shift valves has a bore, an inlet port for introducing the working fluid into the bore, an outlet port selectively connectable to the inlet port and a pilot port for admitting a low pressure fluid into the bore to cause the first and second valve spools to move into the second position against resistant force of the first and the second springs.

3. The electronic and hydraulic system of a five speed automatic transmission as recited in claim 2, wherein the first valve spool has a first land for selectively closing and the inlet port and a second land axially spaced apart from the first land.

4. The electronic and hydraulic system of a five speed automatic transmission as recited in claim 2, wherein each of the second, third and fourth speed valves includes a valve housing, a valve spool slidably fitted into the valve housing for movement between first and second positions and a spring for biasing the valve spool into the first position.

5. The electronic and hydraulic system of a five speed automatic transmission as recited in claim 4, wherein the valve housing of the second speed valve has a bore, a first inlet port connected to the outlet port of the first shift valve, a second inlet port connected to the forward fluid line for introducing the working fluid, a third inlet port adapted to receive the working fluid supplied from the third speed valve and the fourth speed valve, a first outlet port selectively connectable to the second inlet port and leading to the second shift valve and the third speed valve, a third outlet port selectively connectable to the third inlet port and a fourth outlet port adapted for selectively communicating with the third inlet port when the third outlet port remains disconnected from the third inlet port.

6. The electronic and hydraulic system of a five speed automatic transmission as recited in claim 5, wherein the valve spool of the second speed valve has first to fifth lands spaced apart from one another along a length of the valve spool, each of the first to the fifth lands adapted to cooperate with the first to the third inlet ports and the first to the fourth outlet ports of the second speed valve to control the flow of the working fluid through the second speed valve.

7. The electronic and hydraulic system of a five speed automatic transmission as recited in claim 4, wherein the valve housing of the third speed valve has a bore, a first inlet port leading to the outlet port of the second shift valve, a second inlet port leading to the second outlet port of the second speed valve, a third inlet port adapted to receive the working fluid supplied from the oil pump, a first outlet port selectively connectable to the first inlet port of the third speed valve, a second outlet port selectively communicating with the second inlet port of the third speed valve and leading to the third shift valve and the fourth speed valve, and a third outlet port selectively communicating with the third inlet port of the third speed valve and leading to the third inlet port of the second speed valve.

8. The electronic and hydraulic system of a five speed automatic transmission as recited in claim 7, wherein the valve spool of the third speed valve has first to fifth lands spaced apart from one another along a length of the valve spool, each of the first to the fifth lands adapted to cooperate with the first to the third inlet ports and the first to the third outlet ports to control flow of the working fluid through the third speed valve.

9. The electronic and hydraulic system of a five speed automatic transmission as recited in claim 4, wherein the valve housing of the fourth speed valve has a bore, a first inlet port leading to the outlet port of the third shift valve, a second inlet port leading to the second outlet port of the third speed valve, a third inlet port adapted to receive the working fluid supplied from the oil pump, a first outlet port selectively connectable to the first inlet port, a second outlet port selectively connectable to the second inlet port and leading to the fourth shift valve and a third outlet port selectively communicating with the third inlet port.

10. The electronic and hydraulic system of a five speed automatic transmission as recited in claim 9, wherein the valve spool of the fourth speed valve has first to fifth lands spaced apart from one another along a length of the valve spool, each of the first to the fifth lands adapted to cooperate with the first to the third inlet ports and the first to the third outlet ports to control the flow of the working fluid through the fourth speed valve.

11. The electronic and hydraulic system of a five speed automatic transmission as recited in claim 4, wherein the overdrive unit valve includes a valve housing, a valve spool slidably fitted into the valve housing for movement between first and second positions and a spring for biasing the valve spool into the first position.

12. The electronic and hydraulic system of a five speed automatic transmission as recited in claim 11, wherein the valve housing of the overdrive unit valve has a bore, a first inlet port connected to the outlet port of the fourth shift valve, a second inlet port directly connected to the oil pump, a first outlet port selectively communicating with the first inlet port, and a second outlet port selectively communicating with the second inlet port.

13. The electronic and hydraulic system of a five speed automatic transmission as recited in claim 12, wherein the valve spool of the overdrive unit valve has first to third lands spaced apart from one another along a length of the valve spool, each of the first to the third lands adapted to cooperate with the first and the second inlet ports and the first and the second outlet ports to control the flow of the working fluid through the overdrive unit valve.

14. The electronic and hydraulic system of a five speed automatic transmission as recited in claim 1, wherein the hydraulic control system further comprises a reverse gear inhibitor valve adapted to prevent the establishment of the reverse gear ratio when the manual selector valve is inadvertently shifted to a reverse position during a forward travel of the vehicle.

15. The electronic and hydraulic system of a five speed automatic transmission as recited in claim 14, wherein the reverse gear ratio inhibitor valve is controlled by means of the first solenoid valve.

16. The five speed automatic transmission as recited in claim 1, wherein the hydraulic control system further comprises a pressure regulator valve for regulating the pressure of the working fluid to one of low, middle and high pressures.

17. The electronic and hydraulic system of a five speed automatic transmission as recited in claim 16, wherein the hydraulic control system further comprises a pressure reducing valve for generating a pilot fluid by way of reducing the pressure of the working fluid.

* * * * *